United States Patent [19]

Edler et al.

[11] Patent Number: 4,943,401

[45] Date of Patent: Jul. 24, 1990

[54] PROCESS FOR MAKING SILICON NITRIDE ARTICLES

[75] Inventors: James P. Edler; Bohdan Lisowsky, both of Troy, Mich.

[73] Assignee: Eaton Corporation, Cleveland, Ohio

[21] Appl. No.: 135,864

[22] Filed: Dec. 21, 1987

[51] Int. Cl.$^5$ .............................................. C04B 35/58
[52] U.S. Cl. ........................................ 264/63; 501/97; 501/98; 264/86; 264/65; 264/66; 423/344
[58] Field of Search ...................... 501/97, 98; 264/65, 264/86, 63, 66; 423/344

[56] References Cited

U.S. PATENT DOCUMENTS

| 4,067,943 | 1/1978 | Ezis et al. | 264/86 |
| 4,471,060 | 9/1984 | Dickie et al. | 501/151 |
| 4,519,967 | 5/1985 | Crosbie et al. | 264/86 |

FOREIGN PATENT DOCUMENTS

| 54-11114 | 1/1979 | Japan | 423/344 |
| 59-207874 | 11/1984 | Japan | 501/97 |
| 779474 | 7/1957 | United Kingdom | 264/86 |

OTHER PUBLICATIONS

Atkinson et al., "Nitridation of High Purity Silicon", Journal American Ceramic Society, vol. 59, No. 7-8, 285-289.
Shaw et al., "Thermodynamics of Silicon Nitridation: Effect of Hydrogen", Communications of American Ceramic Society, C180-C181, Nov. 1982.
Mangels, "effect of Rate-Controlled Nitriding and Nitriding Atmospheres on the Formation of Reaction Bonded $Si_3N_4$", Ceramic Bulletin, vol. 60, No. 6, 1981.
Moulson, "Review Reaction-Bonded Silicon Nitride: Its Formation and Properties", Journal Materials Science, 14(1979), 1017-1051.
Sacks et al., "Properties of Silicon Suspensions and Slip-Cast Bodies", Ceramics Engineering and science Proceedings, vol. 6, No. 718.
Chemical Abstracts, vol. 107, No. 22, Nov. 1978, Abstract #107: 203934h.
Chemical Abstracts, vol. 103, No. 10., Sep. 1985, Abstract #103: 75322K.

*Primary Examiner*—William R. Dixon, Jr.
*Assistant Examiner*—Deborah Jones
*Attorney, Agent, or Firm*—J. G. Lewis

[57] ABSTRACT

A process for making silicon nitride articles of manufacture such as an internal combustion engine valve (2) by providing a homogeneous water-base slurry of silicon nitride powder and at least one nitriding agent and permitting the slurry to age for a time effective to enable a chemical reaction to occur and then reducing the water content sufficiently to form the article and thence forming and nitriding the article using a compound nitriding cycle.

9 Claims, 1 Drawing Sheet

PROCESS FOR MAKING SILICON NITRIDE ARTICLES

This invention relates generally to a process for making silicon nitride articles of manufacture such as engine valves and more particularly to a reaction bonding process that utilizes a homogeneous water-based slurry of silicon powder and at least one nitriding agent as a starting material and includes a chemical reaction aging requirement as well as a compound schedule for heating the article while blanketed under a nitriding gas effective to provide a quality silicon nitride article in a rapid and economical manner.

BACKGROUND OF THE INVENTION

Because of its high temperature strength and creep resistance and low thermal expansion as well as its excellent oxidation and corrosion resistance, silicon nitride ($Si_3N_4$) has been used for many years to make critically engineered parts such as gas turbine blades.

Generally, it has been the practice to form silicon nitride Parts by "reaction bonding" or by "hot pressing" or by a pressureless sintering process. Reaction bonding comprises compacting silicon powder of commonly less than 400 mesh into the part commonly at ambient temperature and then exposing the part to molecular nitrogen at about 1400° C. for a period of time sufficient to convert the silicon to silicon nitride such as disclosed in U.S. Pat. No. 4,235,857, the disclosure of which is incorporated herein by reference. Such is also reviewed by A. J. Moulson in an article titled "Review Reaction-Bonded Silicon Nitride: Its Formation and Properties," –Journal-Materials Science, 14, (1979) 1017-1051 and by Mangels in an article titled "Effect of Rate-Controlled Nitriding and Nitriding Atmospheres on the Formation of Reaction-Bonded $Si_3N_4$", Ceramic Bulletin, Volume 60, No. 6 (1981), 613 in which he also describes benefits derived by using a nitriding gas mixture of nitrogen with minor amounts of hydrogen and helium. The use of a combined nitrogen-hydrogen nitriding gas in the reaction bonding of $Si_3N_4$ is described by Shaw and Zeleznik in an article titled "Thermodynamics of Silicon Nitridation: Effect of Hydrogen", Communications of the American Ceramic Society, November 1982, C180-C181 and the effect of temperature and nitrogen pressure on the kinetics of silicon nitridation along with the need for an activating agent such as iron is described by Atkinson, Moulson and Roberts in an article titled "Nitridation of High-Purity Silicon", Journal American Ceramic Society, Volume 59, No. 7-8, 285-289.

Hot pressing involves pressing alpha-silicon nitride powder into the part at sintering temperatures of about 1700° C. to about 2200° C. for a prescribed period of time. In the "hot pressing" process, it has further been the practice to add "densification or sintering aids" to the silicon nitride powder to reduce porosity and improve strength. Pressureless sintering involves sintering of alpha-phase silicon nitride powder at temperatures of above 1650-1800° C. to which has been added "densification or sintering aids" similar to "hot pressing." Examples of "densification or sintering aids" include monovalent metal oxides such as $MgO$, $ZrO$, $NiO$, and divalent metal oxides such as $Al_2O_3$, $Cr_2O_3$ and $y_2O_3$ such as disclosed in U.S. Pat. No. 3,950,464, the disclosure of which is incorporated herein by reference.

It is also common to include nitriding agents in the "reaction bonding" process but those presently known to be suitable is much more limited than the "densification or sintering aids" previously described and generally include iron oxide or nickel oxide and mixtures thereof at the present time.

It has also been common Practice to prepare the silicon or silicon nitride powder based compounds by mixing, commonly in a ball mill, with a wetting agent. Commonly such wetting agents have been members of the alcohol family such as tertiary alcohol disclosed in U.S. Pat. Nos. 3,991,166 and 3,992,497, the disclosures of which are incorporated herein by reference.

It has been less common to use water in preparing silicon or silicon nitride ceramic compounds but an example of the use of about 10% by weight water to fluidize a sinterable molding powder prior to freezing is disclosed in U.S. Pat. No. 2,869,215, the disclosure of which is incorporated herein by reference. U.S. Pat. No. 2,268,589, the disclosure of which is incorporated herein by reference, discloses an early use of water in forming a paste with activated silicon which is then fired at 1200° C. to 1450° C.

In addition to nitriding and densification agents, it has also been common practice to employ binders in the ceramic compounds to bind the silicon or silicon nitride powder particles together to enhance their forming into the parts being made. Examples of such binders include a mixture of butyl methacrylate and trichlorethylene disclosed in U.S. Pat. No. 3,819,786 in conjunction with silicon nitride powder and a blend of polyvinyl alcohol and water and a silicon carbide and berylium oxide blend disclosed in U.S. Pat. No. 3,205,080, the disclosures of which are incorporated herein by reference.

Up until the time of the present invention, it has been the further practice to nitride silicon powder by heating for long periods of time. An example of such is disclosed in U.S. Pat. No. 3,819,786, previously described, where a blend of silicon nitride powder and the binder mixture is heated in a stream of nitrogen from ambient to 1000° C. at 50° C./hr and then held under static nitrogen for 20 hours at 1350° C. and 10 hours at 1450° C. with the total time more than thirty hours long.

An example of a compound heating schedule for nitriding a mixture of silicon and silicon carbide powder is disclosed in U.S. Pat. No. 3,222,438, the disclosure of which is incorporated herein by reference, where the mixture is first compacted into a green compact and then heated in an atmosphere of nitrogen at a temperature of 1250° C. for 16 hours and then at 1450° C. for 3-4 hours where the first stage heating is conducted to presinter the compound so that it doesn't melt at the 1450° C. temperature since the melting point of silicon is about 1420° C.

Finally, another example of a compound heating schedule for sintering a silicon nitride and MgO powder mixture is disclosed in U.S. Pat. No. 3,992,497, the disclosure of which is incorporated herein by reference, where the mixture is formed into a compact and then first heated at a temperature of about 600° C. for about 60 minutes to remove volatiles and then the temperature is increased to a temperature between 1500° C. and 1700° C. at a rate of climb above 1450° C. being about 15° C. to 200° C. per minute and holding it at that temperature for a period between about 5 and 30 minutes and more specifically teaching that the heating rate is immaterial until the temperature of about 1450° C. is attained.

Contrary to the above, the process of the present invention, although employing known binders and nitriding agents, utilizes relatively large amounts of water under prescribed conditions in providing a homogeneous slurry of silicon powder and at least one nitriding agent which is subsequently processed and formed into green stock which is then nitrided with a unique compound heating schedule incorporating a multi-component nitriding atmosphere to provide high quality silicon nitride articles in a rapid and economical manner.

SUMMARY OF THE INVENTION

Accordingly, it is an object of this invention to provide a reaction bonding Process for making silicon nitride articles.

It is another object of this invention to provide a reaction bonding Process for making silicon nitride articles that utilizes relatively large amounts of water under prescribed conditions.

It is still another object of this invention to provide a reaction bonding process for making high quality silicon nitride articles that uses both relatively large amounts of water under prescribed conditions and a unique compound nitriding heating schedule.

It is another object of this invention to provide a reaction bonding process for making silicon nitride articles rapidly and of high quality that utilizes relatively large amounts of water and a compound heating schedule for nitriding the articles while under a blanket comprising a novel nitriding mixture of gases.

DESCRIPTION OF SOME PREFERRED EMBODIMENTS

Figure 1:
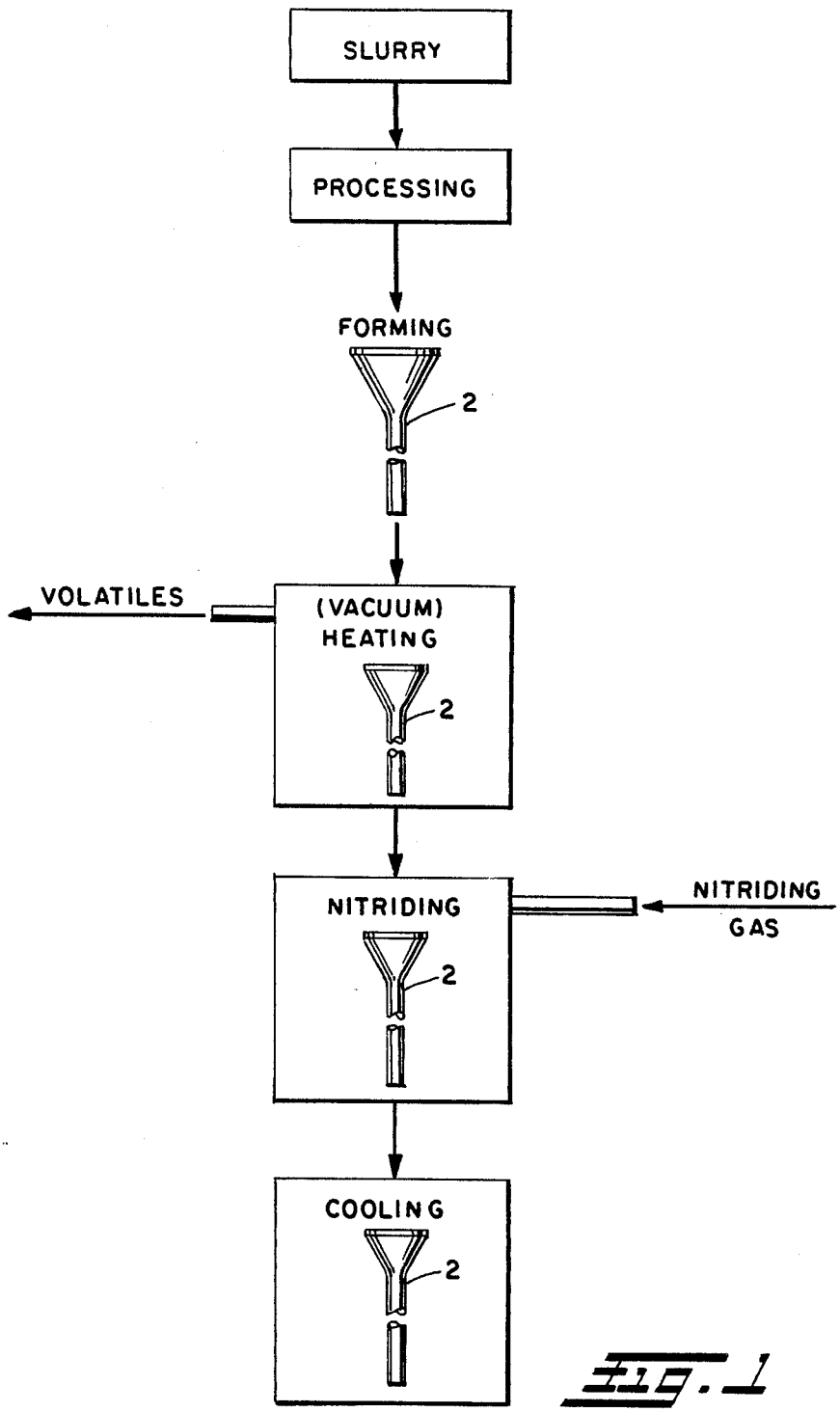
FIG. 1 is a block diagram of an embodiment of the process of the invention being utilized to make a silicon nitride engine valve 2 for illustrative purposes.

The process of the invention starts by providing a homogeneous slurry of silicon powder, water and at least one nitriding agent such as iron oxide predetermined as suitable to enhance nitriding of the silicon powder. Although suitable comminution device may be used, the slurry is preferably prepared in a ball mill type mixer well known to those skilled in the art.

The slurry preferably comprises a mixture of about 40-60 parts by weight silicon powder and from about 60 to about 40 parts by weight water and from about 0.5 parts to about 3 parts by weight of the nitriding agent.

The slurry may additionally include effective amounts of suitable organic binders in conjunction with plasticizers and viscosity modifiers well known to those skilled in the art. Commonly, such organic binders, plasticizers and viscosity agents comprise less than about 5% by weight of the silicon powder.

The amount of water and the amount of binder, if included, can be tailored to provide the viscosity desired for the particular manner in which the article is to be formed. Generally, higher amounts of water will provide lower viscosities suitable for "slip casting" articles which is essentially pouring the mixture into molds shaped to form the article as is well known to those skilled in the art.

The nitriding agent comprises at least one of such agents Predetermined to suitably enhance the nitriding operation hereinafter described. Preferably, the nitriding agent comprises at least one of iron oxide and nickel oxide of which iron oxide has been determined particularly suitable.

Although molecular nitrogen gas may be used for nitriding the silicon, it is preferred that the gas comprises a mixture of from about 40% to about 60% helium on a mole basis and from about 60% to about 40%, on a mole basis, of a blend comprising about 4% hydrogen and about 96% nitrogen.

It has been discovered that helium greatly enhances the thermal conductivity of the gas and that hydrogen, both for purging and as a member of the nitriding gas, enhances the reaction converting silicon to silicon nitride which is believed to be a vapor phase reaction. The pressure of the nitriding gas is preferably controlled so that it blankets the article under a slight positive pressure such as a pressure of about 20 KPa and nitrogen gas is admitted into the furnace to make up for gas loss during the nitriding procedure.

A preferred embodiment of the process of the invention is hereinafter describe din greater detail in which 45-50 Kg of silicon powder, dry ground to a size of approximately 2 F.A.D., (Fisher Average Diameter), of commercial purity, and obtained form a commercial source, is mixed with from 0.5-1.5 Kg of finely ground iron oxide, also obtained from a commercial source, and approximately 15-30 Kg of distilled water. The mixing is done in a ball mill or other comminutation device for a time necessary to effect additional grinding of the silicon and iron oxide to both further reduce the size of the silicon particles and to activate the silicon so that it will react with the water and to assure complete distribution of the iron oxide throughout the silicon slip so that a homogeneous mixture results. Organic binders in conjunction with normal plasticizers and viscosity modifiers, if employed, are preferably added to the ball mill approximately one hour before pumping the slip out of the mill. The silicon slip is aged for a time effective to enable the substantial reaction to occur between the silicon and water which characteristically appears to be at least about 24 hours. During aging, the slip appears to virtually double its volume through frothing. It is believed that the silicon is reacting with the water during aging forming at a minimum, a silicon oxyhydrate coating on the silicon Particles and releasing hydrogen gas. It has been found that the reaction subsides after several days with the slip developing thixotropic properties. Although the slip could be slip cast at this point to form a green body or the water content reduced to permit extrusion of shapes, it is preferred to spray dry the slip to obtain a homogeneous free flowing powder for isopressing or dry compression forming using standard powder metal presses. The use of standard binders common to the ceramics industry produces compacts with sufficient strength to allow machining without the need for special heat treatments which partially nitride or sinter the silicon compact. The green silicon compacts are then loaded into a furnace operable to perform the nitridation of the silicon as hereinafter described.

The furnace is of a type having good heat insulating characteristics and accurate temperature control. It is positioned within a vacuum chamber preferably capable of holding a positive pressure of up to about 170 KPa absolute. Gases are admitted to the furnace through a precision gas regulator. The gas regulator permits control of the pressure in the furnace from 100-150 KPa absolute and maintains a constant pressure in the furnace. Furnace atmosphere is allowed to leave the furnace preferably through a burner arrangement.

The vacuum chamber is evacuated to remove oxygen from the furnace. The furnace is then backfilled with pure hydrogen and the start of the nitriding cycle is initiated. The first part of the nitriding cycle comprises heating the furnace to a temperature in the 600–1000° C. range, while flowing pure hydrogen through the furnace. The heating rate during this portion of the cycle is controlled at a rate of about 500° C. per hour. The pure hydrogen gas which is flowing through the furnace is burned in the burner arrangement as it exits the furnace which is also effective to remove any organic binders from the furnace as they come out of the silicon compacts. Once the furnace temperature has reached the range of 600–1000° C., the hydrogen gas is then turned off and the furnace purged with helium until a non-combustible gas mixture is left in the furnace whereupon the furnace is evacuated. The furnace is caused to come to a temperature hold when it reaches about 1000° C. until the furnace has been evacuated. Once the required vacuum is achieved at about 1000° C. the furnace is backfilled to an absolute pressure of about 50 KPa with high purity helium, and then the furnace is further backfilled with a nitriding gas mixture preferably comprising from about 1 to about 4 parts hydrogen and the balance nitrogen to a pressure of about 120–135 KPa absolute. The inlet line to the furnace is then switched to a cylinder of high purity nitrogen which will replace the nitrogen consumed during the nitriding of the silicon. Unlike Mangels' demand nitriding cycle previously described in which the composition of the nitriding atmosphere changes during nitriding, the preferred nitriding atmosphere of the process of the invention remains constant in chemical composition throughout the nitridation of the silicon. Once the backfilling of the furnace with the nitriding gas begins, an increasing temperature ramp of 20 to 25 C. per hour is initiated to run the furnace to a temperature of approximately 1420° C. A one-hour soak period at 1420° C. is allowed before cooling to room temperature. A second important difference between the preferred nitriding cycle of the process of the invention and others is that the furnace temperature is virtually continuously increasing from a temperature of approximately 1000° C. to the melting point of silicon (1420° C.) with the only temperature hold occurring at the end of the cycle. A significant result of the process of the invention is that it is readily adaptable to a continuous type of kiln similar to a tunnel kiln, not just batch kilns as are normally used in the manufacture of reaction bonded silicon nitride.

Using the above-described process for the manufacture of reaction bonded silicon nitride, test bars have been made with modulus of rupture (MOR) strengths tested in the as-fired condition in excess of 241 MPa with typical modulus of rupture being in the range of about 172–206 MPa. Typically, a 90–95% conversion, based on optical microscopy, in parts up to one inch in cross section has been observed.

Thus, by means of aging a slurry of silicon powder and water in conjunction with at least one nitriding agent and then nitriding articles formed therefrom under a compound heating schedule, a process is provided by which to make silicon nitride articles of high quality in a rapid and economical manner.

What is claimed is:

1. A process for making a silicon nitride article, said process including the steps of:
   (a) providing a homogeneous slurry comprising a mixture of about 40–60 parts by weight silicon powder, about 60–40 parts by weight water, and from about 0.5 to about 3 parts by weight of at least one nitriding agent;
   (b) comminuting the slurry of step (a) in a comminutation device to activate the silicon powder and enhance a chemical reaction between the silicon powder and the water;
   (c) aging the activated silicon slurry of step (b) for a period of time effective to enable the chemical reaction between the silicon powder and the water to occur;
   (d) processing the aged silicon slurry of step (c) to reduce the water content sufficiently to form the article;
   (e) forming the processed slurry of step (d) into the article;
   (f) heating the article of step (e) from ambient temperature to a temperature of about 1000° C. in a hydrogen atmosphere at a rate non-damaging to the article whilst removing volatiles therefrom;
   exposing the article of step (f) to gas;
   (g) heating the article of step (f) from the temperature of step (f) to a temperature from about 1400° C. to about 1450° C. at a rate of from about 15° C. to about 25° C. per hour in said gas mixture of from about 40 parts to about 60 parts helium and from about 1 part to about 4 parts hydrogen and the balance nitrogen, whilst replenishing consumed nitrogen with fresh nitrogen so as to maintain a substantially constant nitriding gas composition while converting the silicon powder therein to silicon nitride; and
   (h) cooling the article of step (g) to ambient temperature.

2. The process of claim 1 wherein the processing of step (d) is spray drying.

3. The process of claim 1 wherein the nitrogen containing gas of step (g) is a mixture of helium, hydrogen and nitrogen.

4. The process of claim 1 wherein the nitriding agent of step (a) is selected from the group consisting of iron oxide and nickel oxide and mixtures thereof.

5. The process of claim 1 wherein the slurry of step (a) includes at least one organic binder.

6. The process of claim 5 wherein the slurry includes at least one plasticizer.

7. The process of claim 1, 6 wherein the slurry includes at least one viscosity modifier.

8. The process of claim 1 wherein the heating rate of step (f) is about 400° C. to about 600° C. per hour.

9. The process of claim 1 wherein the processing of step (e) is effective to provide a free-flowing Powder suitable for forming the article.

* * * * *

UNITED STATES PATENT AND TRADEMARK OFFICE
CERTIFICATE OF CORRECTION

PATENT NO. : 4,943,401

DATED : July 24, 1990

INVENTOR(S) : James P. Edler, et al

It is certified that error appears in the above-identified patent and that said Letters Patent is hereby corrected as shown below:

Col. 1 line 23 "Parts" should read --part--.
Col. 2 line 7 "Practice" should be --practice--.
Col. 3 line 14 "Process" should be --process--.
      line 17 "Process" should be --process--.
      line 44 "Although suitable" should be --Although any suitable--.

Col. 4 line 23 "form" should be --from--.
      line 44 "Particles" should be --particles--.

Col. 6 line 28 Delete "exposing the article of step (f) to gas;"
      line 30 After "(f)" insert therefore --in a nitrogen containing gas--;
      line 52 Delete "5" and insert therefore --1 or 6--;
      line 54 After "1," insert therefore --or--;
      line 59 "Powder" should be --powder--.

Signed and Sealed this

Sixth Day of April, 1993

*Attest:*

STEPHEN G. KUNIN

*Attesting Officer*      *Acting Commissioner of Patents and Trademarks*